S. C. CARY.
CORRUGATED METAL FASTENER.
APPLICATION FILED MAR. 6, 1907.
1,169,124.
Patented Jan. 25, 1916.
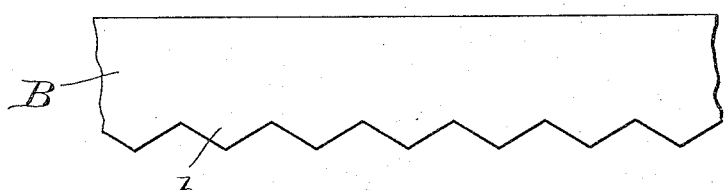
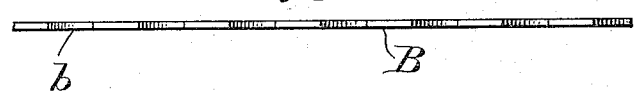
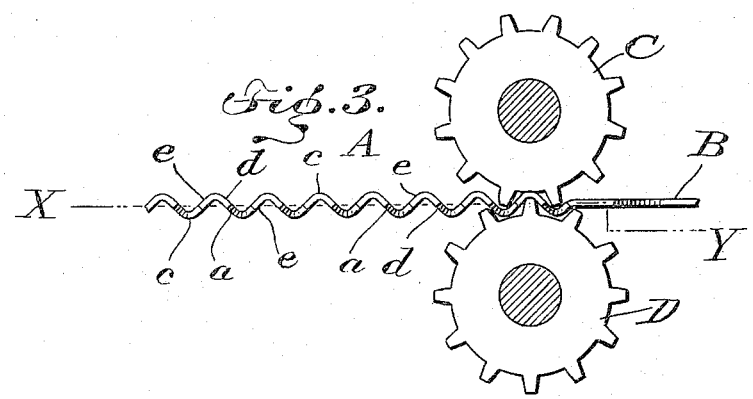
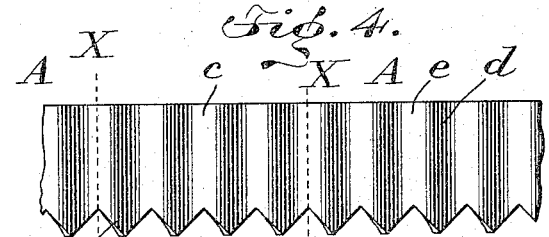
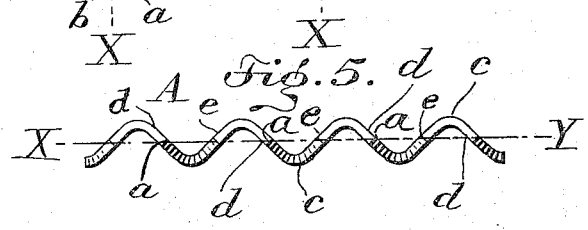
WITNESSES
INVENTOR
Spencer C. Cary
BY
ATTORNEYS

UNITED STATES PATENT OFFICE.

SPENCER C. CARY, OF NEW YORK, N. Y.

CORRUGATED METAL FASTENER.

1,169,124.  Specification of Letters Patent.  Patented Jan. 25, 1916.

Application filed March 6, 1907. Serial No. 360,920.

*To all whom it may concern:*

Be it known that I, SPENCER C. CARY, a citizen of the United States, residing in the city of New York, borough of Manhattan, county and State of New York, have invented a new and useful Corrugated Metal Fastener, of which the following is a specification.

This invention is a corrugated metal fastener adapted for various uses, but more particularly as a box fastener.

The object of the invention is to produce a corrugated fastener of such construction that it may be driven into material in a straight direction or without change in the plane of penetration, and to produce it in a simple and economical manner without resort to the expensive operation of grinding, the improved fastener being complete or finished when it leaves the corrugating rolls, or similar mechanism, and requiring no other treatment to adapt it for use except to cut the long strip of metal into suitable lengths.

In the accompanying drawing I have shown one embodiment of the invention, but the construction shown therein is to be understood as illustrative, only, and not as defining the limits of the invention. The drawings show, moreover, the simple method of making the fastener.

Figure 1 is a plan view of a stamped strip or length of sheet metal forming a blank adapted for the manufacture of fasteners in accordance with this invention. Fig. 2 is a view of the serrated edge thereof. Fig. 3 is a side view of one embodiment of means for corrugating the stamped strip or blank shown in Figs. 1 and 2. Fig. 4 is a side view of the finished corrugated strip, partly broken away. Fig. 5 is an elevation looking at the driving edge of the fastener, said view showing the fastener on an enlarged scale as compared with Figs. 3 and 4.

The salient feature of my new corrugated fastener, produced without grinding, consists in positioning the points $a$, of the teeth $b$, in the medial line X—Y, see Figs. 3 and 5, of the fastener A, *i. e.*, in a line intermediate the crests of the corrugations $c$.

As shown, the fastener is made from a single piece of metal having a plurality of transverse corrugations $c$, and a corresponding number of teeth $b$, forming the driving edge of the fastener.

Each tooth, $b$, is arranged in a novel manner with respect to its adjacent corrugations $c$. As shown in Figs. 3 and 5, the corrugated fastener is composed of inclined members $d$, $e$, all the members $d$ being similarly inclined in one direction, and the members $e$ being similarly inclined and in an opposite direction to members $d$. It will be noted that members $d$, alternate with members $e$, the whole forming the body or main part of the fastener.

In some types of corrugated fasteners of the prior art, the points of the teeth, looking at the penetrating edge of the fastener while the latter is positioned in a horizontal plane, are at the highest part of the teeth forming corrugations, the pointed teeth thus being on one side of the fastener, instead of in the medial line. As a result of this construction, the fastener cannot be driven straight, the bevel thereon, being inclined to one side, forces the fastener when entering the wood and particularly if driven across the grain thereof, to depart from a straight path. This, of course, is a pronounced disadvantage.

Fasteners which would drive straight have been made by taking a plain corrugated strip, both edges of which are parallel, *i. e.*, neither of said edges are serrated, and grinding the driving edge on both faces so as to produce two bevels, the result being teeth having their points in a line intermediate the alternate crests of the corrugations, *i. e.*, in the medial line of the fastener. As incidentally referred to, in making this type of fastener the material is first corrugated and subsequently ground.

My fastener is made without resorting to the expensive operation of grinding, and, moreover, is of such construction that it naturally drives straight. Further, in making my fastener, I start with a plain strip, both edges of which are parallel, and first serrate what is to be the driving edge thereof, thereby producing teeth $b$, see Figs. 1 and 2. It will be noted that the serrations are made in the strip prior to corrugating it. I then corrugate the strip so that the points $a$ of the teeth $b$ are in the medial line, X—Y, see Figs. 3 and 5 of the fastener; *i. e.*, in a line intermediate the alternate crests of the corrugations.

The teeth, or as they may be termed pointed members, of my fastener are each beveled on their two edges, said bevels of each tooth or pointed member being in the general direction of the length of the fastener, in contradistinction to the transverse bevels made on the sides of some prior fasteners by grinding the lateral faces thereof. This longitudinal beveling is produced by forming the teeth on the metal blank when it is stamped or cut out, and prior to the operation of corrugating the toothed blank.

A preferred mode of procedure for producing the fasteners is to take a strip of metal B of the required length, width and thickness. This strip while in the flat condition is cut or stamped by suitable devices, such as dies, to produce a series of teeth $b$ which somewhat resemble saw teeth, the teeth being on one edge of the strip, as shown by Figs. 1 and 2. The next step in the manipulation of the metal is to corrugate the same, and, at this stage of the manufacture, care and accuracy are required in the treatment of the stamped material in order to bring the points $a$ of the teeth in the required position. Any suitable machinery may be employed for this purpose, but in practice I find the corrugating rolls C, D, to be well adapted for the work, provided they are accurately adjusted in order to regulate the feed of the material and to produce the crimps or corrugations at the required places, there being the same number of corrugations as there are teeth. The stamped and corrugated strip is now cut transversely, as on the lines X—X in Fig. 4, to produce lengths suitable for use as fasteners adapted for different purposes.

Having thus fully described the invention, what I claim as new, and desire to secure by Letters Patent is:—

As a new article of manufacture, a fastening device consisting of a metallic strip provided with corrugations, one edge of said strip having a series of pointed members corresponding in number to the number of said corrugations, the points of said members being in substantially a straight line which is located in a plane intermediate two planes, one of which connects the crests of the corrugations on one face of the fastener, and the other of which planes connects the crests of the corrugations on the other face of said fastener, the bases of said pointed members extending obliquely between said two planes.

In testimony whereof, I have hereunto signed my name in the presence of two subscribing witnesses.

SPENCER C. CARY.

Witnesses:
 JAS. H. GRIFFIN,
 H. I. BERNHARD.

Copies of this patent may be obtained for five cents each, by addressing the "Commissioner of Patents, Washington, D. C."